US010850964B2

(12) United States Patent
Bhaskar et al.

(10) Patent No.: US 10,850,964 B2
(45) Date of Patent: Dec. 1, 2020

(54) SYSTEM AND METHOD FOR FILLING CONTAINERS WITH A PRECISE AMOUNT OF FLUID

(71) Applicant: Accenture Global Solutions Limited, Dublin (IE)

(72) Inventors: Dokiparti Vudaya Bhaskar, Ahmedabad (IN); Ashish Bhatia, Gurgaon (IN); Prashant Sanghvi, Gurgaon (IN); Priyank Bajpai, Jabalpur (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/361,723

(22) Filed: Mar. 22, 2019

(65) Prior Publication Data

US 2020/0299120 A1    Sep. 24, 2020

(51) Int. Cl.
*B67C 3/20* (2006.01)
*B67C 3/00* (2006.01)
*G01G 15/00* (2006.01)
*B67C 3/28* (2006.01)
*B65B 3/28* (2006.01)

(52) U.S. Cl.
CPC .............. *B67C 3/202* (2013.01); *B65B 3/28* (2013.01); *B67C 3/007* (2013.01); *B67C 3/28* (2013.01); *G01G 15/001* (2013.01); *G01G 2015/005* (2013.01)

(58) Field of Classification Search
CPC ........... B67C 3/007; B67C 3/202; B67C 3/28; B67C 3/282; B67C 3/286; B65B 3/28; G01G 15/001; G01G 2015/005
See application file for complete search history.

(56) References Cited

U.S. PATENT DOCUMENTS

| 2,929,406 | A | * | 3/1960 | Anderson | ............. F16K 27/067 137/615 |
| 3,260,285 | A | | 7/1966 | Vogt | |
| 4,222,448 | A | | 9/1980 | Sunkle et al. | |
| 4,582,102 | A | * | 4/1986 | Risser | ..................... B67C 3/202 141/144 |

(Continued)

FOREIGN PATENT DOCUMENTS

CN    204201152 U    3/2015

OTHER PUBLICATIONS

Extended European Search Report dated Aug. 3, 2020 for European Patent Application No. 20164533.0.

*Primary Examiner* — Andrew D Stclair
(74) *Attorney, Agent, or Firm* — Plumsea Law Group, LLC

(57) ABSTRACT

A system and method for filling containers with a precise amount of fluid is disclosed. The system and method use artificial neural network logic to sense conditions and to control the two-valve dispensing unit based on the sensed conditions to fill containers with a precise amount of fluid. Using neural network logic combined with sensors and controllers for equipment eliminates the significant human effort and human errors associated with manually filling containers with fluid. Furthermore, the neural network can log data quicker and with more accuracy than a human manually logging data. The system and method use a two-valve dispensing unit to precisely fill and to prevent and clear clogs caused by fluid solidifying within the dispensing unit.

20 Claims, 6 Drawing Sheets

(56) References Cited

U.S. PATENT DOCUMENTS

| | | | | |
|---|---|---|---|---|
| 4,749,008 | A | * | 6/1988 | Whitney .................. B65B 3/28 |
| | | | | 141/1 |
| 4,976,377 | A | | 12/1990 | Higuchi et al. |
| 5,148,841 | A | * | 9/1992 | Graffin ..................... B65B 3/28 |
| | | | | 141/128 |
| 5,287,896 | A | * | 2/1994 | Graffin ..................... B65B 3/28 |
| | | | | 141/1 |
| 5,505,233 | A | * | 4/1996 | Roberts .................... B65B 3/28 |
| | | | | 141/231 |
| 5,515,888 | A | * | 5/1996 | Graffin ..................... B65B 3/28 |
| | | | | 141/1 |
| 6,321,798 | B1 | * | 11/2001 | Solignac ............. B01F 15/0234 |
| | | | | 141/192 |
| 6,380,495 | B1 | | 4/2002 | Ash |
| 8,230,877 | B2 | | 7/2012 | Roberge et al. |
| 8,430,135 | B2 | * | 4/2013 | Waters ..................... B65B 3/28 |
| | | | | 141/192 |
| 8,740,175 | B2 | * | 6/2014 | Kawamura ........... B67C 3/2608 |
| | | | | 251/342 |
| 2006/0238346 | A1 | * | 10/2006 | Teller .................. B67D 3/0077 |
| | | | | 340/572.1 |
| 2007/0107801 | A1 | * | 5/2007 | Cochran .................. B65B 3/36 |
| | | | | 141/153 |
| 2007/0157990 | A1 | * | 7/2007 | Amano .................... B65B 1/16 |
| | | | | 141/83 |
| 2010/0254731 | A1 | | 10/2010 | Centofante et al. |
| 2012/0291898 | A1 | * | 11/2012 | Auer ........................ B65B 3/22 |
| | | | | 137/614.18 |

\* cited by examiner

SYSTEM AND METHOD FOR FILLING
CONTAINERS WITH A PRECISE AMOUNT
OF FLUID

TECHNICAL FIELD

The present disclosure generally relates to filling containers with fluid. More specifically, the present disclosure generally relates to a system and method for filling containers with fluid. Even more specifically, the present disclosure generally relates to a system and method for filling containers with a precise amount of fluid.

BACKGROUND

In the manufacturing process of filling containers with fluid, many issues can arise. For example, a serious issue is overfilling or underfilling containers. Regulatory agencies issue penalties under law for the sale of containers holding less liquid than stated on the label. Additionally, when a customer receives less fluid than she paid for, the customer begins to distrust the brand selling the container. Consistently underfilling over time can decrease the value of the brand. In instances where too much fluid fills a container, the company selling the container may lose income by giving the customer more than she paid for. Every instance of overfilling contributes to a significant loss of product that costs the company selling the product money.

Many issues in the manufacturing process of filling containers with fluid are caused by humans. For example, a common cause of overfilling and underfilling containers is human error. Humans make many errors when using visual inspection to monitor the amount of fluid filling a container and when manually closing and opening valves. In addition to the underfilling and overfilling of containers, the amount of time it takes to fill each container is limited by how quickly a human can notice when a precise amount of fluid has been dispensed into a container and how quickly a human can react to stop the flow of fluid. When humans are relied upon to report packed container weights through log sheets and manually upload data to environment resource planning software, the duration of the filling process is limited by how quickly a human can report and upload data, and the accuracy of the filling process suffers due to how humans are prone to making mistakes, especially under time constraints.

Another issue contributing to issues with underfilling and overfilling is filling containers with a high-viscosity fluid (e.g., a liquid adhesive, honey, or a hair gel). The sticky nature of the fluid may make it difficult to fill each container with an exact amount of fluid. Over time, the fluid may dry out and solidify as it is exposed to air, particularly in the area next to the outlet dispensing the fluid. The solidified fluid may clog the outlet, thus making it difficult to control the amount of fluid being dispensed. With the outlet clogged, the size of the opening through which the fluid moves decreases, causing the flow rate of the fluid to decrease. Later on, a piece of solidified fluid may break off during dispensing, which may ruin the integrity of the fluid in the container as well as increase the opening through which the fluid moves, thus increasing the flow rate of the fluid. With the size of the opening changing over time, it is difficult to predict the flow rate of the fluid and to thus dispense a precise amount of fluid. Additionally, when fluid solidifies within an opening, the solidified material itself can be a loss.

Another factor contributing to overfilling is the way that viscous fluids flow. The viscous nature of the fluid can make the fluid drip in clumps, even after the flow of fluid has been stopped. A clump falling into a container after filling can cause the container to be overfilled.

There is a need in the art for a system and method that addresses the shortcomings discussed above.

SUMMARY

A system and method for filling containers with a precise amount of fluid is disclosed. The system and method solve the problems discussed above by using a two-valve dispensing unit to prevent and clear clogs, and by using neural network logic to use readings from a scale to control the two-valve dispensing unit fill containers with a precise amount of fluid. The artificial neural network logic uses results from past completed filling cycles, as well as real time readings (e.g., 300 readings taken every second), to improve current filling cycles.

In one aspect, the disclosure provides a method of filling containers with a precise amount of fluid. The method may include performing a first filling cycle including weighing an empty container on a scale to obtain a container weight. The first filling cycle may further include automatically dispensing fluid from an outlet at a first flow rate by opening a first valve to a first position in which the first valve is fully open and opening a second valve downstream of the first valve to a second position in which the second valve is fully open. The first filling cycle may further include continuously monitoring a weight of the fluid received by the container as the fluid is dispensed into the container. The first filling cycle may further include automatically determining when a first threshold is reached. The first filling cycle may further include automatically dispensing fluid from the outlet at a second flow rate by throttling the first valve to a third position in which the first valve is partially open based on reaching a first threshold. The first filling cycle may further include automatically determining when a second threshold is reached. The first filling cycle may further include automatically closing one or both of the first valve and the second valve to a fully closed position when the second threshold is reached. The first filling cycle may further include automatically storing the final measured weight of fluid filling the container once one or both of the first valve and the second valve is in a fully closed position. The first filling cycle may further include automatically determining and storing a difference in weight between the final measured weight and the target weight for the fluid filling the container. The method may further include performing a second filling cycle. The second filling cycle may include using the difference in weight to modify one or more of the target weight, first threshold, the second threshold, the first position, the second position, and the third position.

In yet another aspect, the disclosure provides a system for filling containers with a precise amount of fluid. The system may include a dispensing unit configured to be mechanically connected to a vessel containing a fluid. The dispensing unit may include an inlet, a first valve disposed adjacent the inlet, a second valve downstream of the first valve, and an outlet downstream of the second valve. The system may include a scale configured to receive a container in a position beneath the outlet. The system may include a device processor in electrical communication with both the scale and the dispensing unit. The system may include a non-transitory computer readable medium storing instructions that are executable by the device processor. The instructions may be executable by the device processor to perform a first filling cycle. The first filling cycle may include receiving the weight of an empty container. The first filling cycle may include automatically controlling dispensing of fluid from an outlet at a first flow rate by causing the first valve to open to a first position in which the first valve is fully open and by causing the second valve to open to a second position in which the second valve is fully open. The first filling cycle may include continuously monitoring the weight of the fluid received by the container as the fluid is dispensed into the container. The first filling cycle may include determining the first flow rate by monitoring the amount of fluid dispensed within a predetermined amount of time. The first filling cycle may include determining when a first threshold has been reached. The first filling cycle may include automatically controlling dispensing fluid from the outlet at a second flow rate when the first threshold has been reached. The first filling cycle may include determining when a second threshold has been reached. The first filling cycle may include causing one or both of the first valve and the second valve to close to a fully closed position when the second threshold has been reached. The first filling cycle may include storing the final measured weight of fluid filling the container once one or both of the first valve and the second valve is in a fully closed position.

In yet another aspect, the disclosure provides a system for filling containers with a precise amount of fluid. The system may include a dispensing unit configured to be mechanically connected to a vessel containing a fluid. The dispensing unit may include an inlet, a first valve disposed adjacent the inlet, a second valve downstream of the first valve, and an outlet downstream of the second valve. The system may include a scale configured to receive a container in a position beneath the outlet. The system may include a device processor in electrical communication with both the scale and the dispensing unit. The system may include a non-transitory computer readable medium storing instructions that are executable by the device processor. The instructions may be executable by the device processor to perform a first filling cycle. The first filling cycle may include receiving the weight of an empty container. The first filling cycle may include automatically controlling dispensing of fluid from an outlet at a first flow rate by causing the first valve to open to a first position in which the first valve is fully open and by causing the second valve to open to a second position in which the second valve is fully open. The first filling cycle may include continuously monitoring the weight of the fluid received by the container as the fluid is dispensed into the container. The first filling cycle may include determining the first flow rate by monitoring the amount of fluid dispensed within a predetermined amount of time. The first filling cycle may include determining when a first threshold has been reached. The first filling cycle may include automatically controlling dispensing fluid from the outlet at a second flow rate by causing the first valve to throttle to a third position in which the first valve is partially open when the first threshold has been reached. The first filling cycle may include determining when a second threshold has been reached. The first filling cycle may include causing one or both of the first valve and the second valve to close to a fully closed position when the second threshold has been reached. The first filling cycle may include storing the final measured weight of fluid filling the container once one or both of the first valve and the second valve is in a fully closed position. The first filling cycle may include determining and storing a difference in weight between the final measured weight and the target weight for the fluid filling the container. The instructions may be executable by the device processor to perform a second filling cycle. The second filling cycle may include using the determined difference in weight to modify one or more of the first threshold, the second threshold, the first position, the second position, and the third position.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The system for filling containers with a precise amount of fluid may include a dispensing unit configured to address the issue of solidified fluid clogging a dispensing channel or outlet and the issue of viscous fluids dripping into a container after intentional filling has been ceased. For example, as discussed in more detail below with respect to FIGS. 1-6, the system may include two valves positioned such that one valve reduces the amount of ambient air reaching another valve. Reducing a valve's exposure to air reduces the amount of fluid solidified near the same valve. The valve that is positioned closer to the outlet may be removable from the dispensing unit such that the same valve can be easily replaced when it is clogged with solidified material.

Figure 1:
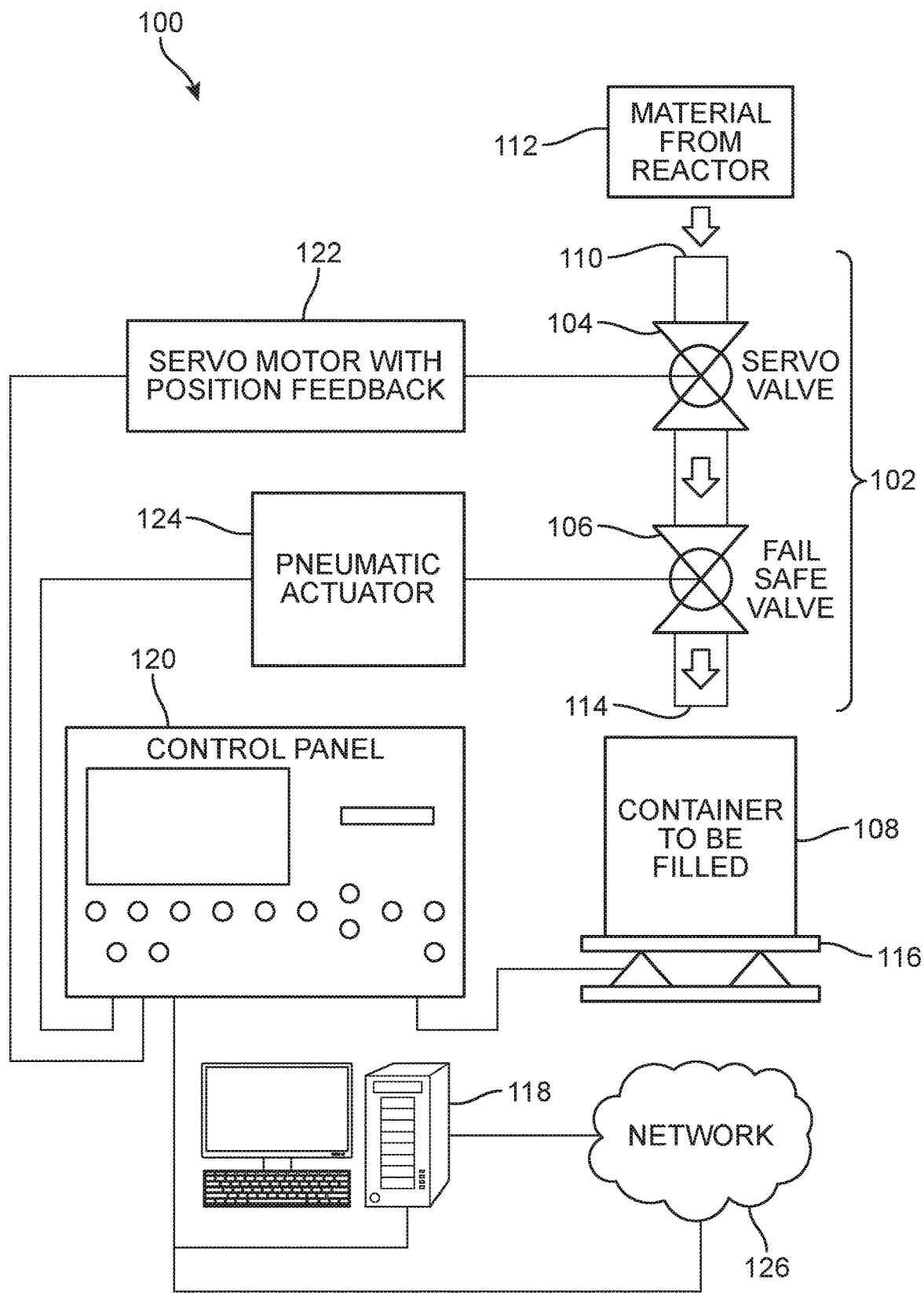
FIG. 1 is a schematic diagram of an embodiment of a system for filling containers with a precise amount of fluid.

The first valve may have a fully open position providing the largest passageway through the valve, a fully closed position shutting off the passageway through the valve, and one or more positions between fully open and fully closed. These positions between fully open and fully closed may provide a smaller passageway through the valve with respect to the fully open position and may thereby decrease the flow of fluid through the valve. Accordingly, the first valve may be moved to these different positions to fine tune the flow rate of fluid through the first valve. In some embodiments, the second valve may have the same positions as the first valve. In other embodiments, the second valve may have only a fully open and a fully closed position. In some embodiments, the first valve may be throttled to different positions by a servo motor. For example, as shown in the embodiment of FIG. 1, first valve 104 is a servo valve throttled by a servo motor with position feedback 122. It is understood that sensors within the motor and/or valve can provide the position feedback for the motor and/or valve.

In some embodiments, the second valve may be swiftly moved between a fully open and a fully closed position by a pneumatic actuator. For example, as shown in the embodiment of FIG. 1, second valve 106 is a fail-safe valve opened and closed by a pneumatic actuator 124. By nature of being fail-safe, the valve is biased to a closed position such that the valve closes in the event of a power loss or other situation where the valve is not being manipulated. While the embodiment shown in FIG. 1 is shown with the first valve as a servo valve and the second valve as a fail-safe valve, it is understood that many different types of valves may be suitable for use in the system. For example, in some embodiments, both the first valve and the second valve are servo valves. In some embodiments, either or both of the valves may be an IoT (Internet of things) valve which can sense the matter that passes through it, as well as various environmental conditions such as temperature, pressure, vibration, humidity, acoustics and more. In some embodiments, either or both valves may be both servo valves and IoT valves. Using a combination of machine learning, edge computing, and a cloud network, connected industrial IoT valves can provide accurate and cost effective measurement and monitoring capabilities such as detecting leaks, bursts, or deviations from normal operations in real-time.

The system may include a scale configured to measure the weight of a container as it is being filled with fluid. For example, as shown in the embodiment of FIG. 1, a scale 116 may be positioned such that container 108 may be set on scale 116 in a location where fluid dispensed by dispensing unit 102 flows into container 108. In some embodiments, the scale may have a tare function, enabling the scale to zero out a weight of an empty container when monitoring the weight of a fluid during the course of filling the container. In some embodiments, the system will not fill a container unless is a container is detected as being present on the scale. This detection may be performed by the scale itself or another type of sensor capable of detecting the container's presence on the scale. In some embodiments, the system may include an alert, such as a buzzer or flashing display, to alert a user that a container is not present on the scale when a user tries to begin the filling process.

The scale and valves may be connected to a user device including a device processor. For example, as shown in the embodiment of FIG. 1, first valve 104, second valve 108, and scale 116 may be connected to a desktop computer 118. While FIG. 1 shows the user device as a desktop computer, the user device may be any computing device used by a user. For example, in some embodiments, the user device may be a smartphone, a laptop computer, a tablet, or another type of computing device. The user device may include a display that provides an interface for the user to input and/or view information. In some embodiments, the user device may include one or more user devices. In some embodiments, multiple user devices may be connected to one another by a network, such as a wide area network ("WAN"), or a local area network ("LAN"). In some embodiments, the user device and other components of the system may be connected to one or more servers. Each server may be a single computer, the partial computing resources of a single computer, a plurality of computers communicating with one another, or a network of remote servers (e.g., cloud). For example, as shown in FIG. 1, desktop computer 118 and control panel 120 are connected to a cloud network 126. It is understood that the one or more servers can house local databases and/or communicate with one or more external databases to store and retrieve data. For example, in some embodiments, the disclosed method may include receiving additional sensor inputs from IoT sensors and storing the additional sensor inputs as sensor data in the cloud network. In some embodiments, reports generated with filling data may be stored in a cloud network. The user device may be capable of executing a non-transitory computer readable medium storing instructions to perform filling cycles in the manner described with respect to the method below.

In some embodiments, the scale and valves may be connected to a control panel. For example, as shown in the embodiment of FIG. 1, first valve 104, second valve 108, and scale 116 may be connected to a control panel 120. The control panel may also be connected to the user device. The control panel may provide a way to initiate the filling of a container. For example, when the system is located on a shop floor, the control panel may provide an easy to understand way for workers to initiate filling of a container. In some embodiments, the control panel may provide a few simple features, such as start filling, pause filling, and stop or end filling. Due to simple nature of the control panel and the neural network's ability to manage all of the details, a worker does not require much skill to interact with the system. In some embodiments, the control panel may also include inputs used to control filling parameters. For example, the control panel inputs may include the type of fluid to be dispensed, the viscosity of the fluid to be dispensed, and/or the thresholds (including the desired final weight (or "target weight") of the fluid filling the container) discussed below with respect to the method.

The control panel may simplify the worker's duties on the floor, while the user device works in conjunction with the control panel to execute the filling of containers. For example, in some embodiments, a worker may press a button on the control panel (touch a virtual button on a screen of a control panel) to simply initiate filling. To prevent fires, the control device and its electronics may be enclosed inside a flameproof case. The control device could then communicate to the user device that the filling process is to begin. The user device could then control the details of the filling process, including performing the filling process according to the method discussed in more detail below. In another example, in some embodiments, the worker may input the type of fluid (e.g., a particular type of adhesive) and/or the target weight of the fluid filling the container into the control panel. The control device could then communicate the inputs to the user device. The user device could then use these inputs to control the details of the filling process, including performing the filling process according to the method discussed in more detail below.

The user device can provide a user (e.g., worker or supervisor) with the ability to see and report data related to filling. For example, a user worker can use the user device to report autogenerated filling data on a container-by-container basis. In another example, filling data may be automatically reported. In some embodiments, the user device may provide alerts for deviation. In such embodiments, the alert may prompt a secondary check for supervisor review. For example, if the empty container is noncompliant with specifications due to lower weight compared with a standard empty container the machine can raise an alarm. This alarm can prompt a user to take necessary action. An autogenerated log can be produced in response to the alarm, and the autogenerated log can be used for further analysis, e.g. number of such occurrences in the shift, etc.

By continuously monitoring the weight of the fluid filling the container as it is being filled, the flow rate of the fluid may also be monitored and controlled. The valves may be opened into different positions depending upon the flow rate of the fluid and/or the amount of fluid filling the container. For example, the beginning flow rate may be high. This mode of filling may be referred to as a "coarse mode." As the container is closer to being full, e.g., when the container is 98% full, the flow rate may be decreased such that filling of the container may be ended just as the predetermined target amount of fluid fills the container. This mode of filling may be referred to as a "fine mode." The predetermined target amount of fluid may be set as a predetermined target weight.

Since there may be some variation with respect to the weight of the containers filled and the way the high-viscosity fluid behaves (e.g., over time the fluid may solidify more and may flow slower and/or clump), the method may be performed by using an artificial neural network to track the difference between the predetermined target weight and the actual final weight of the filled containers. The history of these differences may be inputs that inform the next filling cycle. For example, the difference between the predetermined target weight and the actual final weight of a fluid in a filled container may be used to modify various parameters, such as the positions of the valves and/or the amount of time that the valves are held in particular positions.

FIG. 1 shows a schematic diagram of an embodiment of a system for filling containers with a precise amount of fluid 100 (or system 100). The system may include a dispensing unit configured to receive fluid from a fluid source, such as a vessel containing fluid, and to dispense fluid into a container. For example, system 100 includes a dispensing unit 102 configured to receive fluid from an adhesive reactor 112 (or reactor 112) and to dispense fluid into a container 108. While an adhesive reactor is shown in the embodiment of FIG. 1, the dispensing unit may receive fluid from any other type of fluid source. For example, the fluid source may simply be a vessel containing a fluid. The dispensing unit may have an inlet configured to receive fluids from a fluid source. For example, dispensing unit 102 includes an inlet 110 configured to receive fluids from reactor 112. The dispensing unit may have an outlet configured to dispense fluids. For example, dispensing unit 102 includes an outlet 114. The dispensing unit may include a flow channel disposed between the inlet and the outlet, such that fluid may flow into the inlet through the flow channel and out of the outlet. For example, the flow channel may include a tube, a pipe, or a passageway bored through a solid structure.

The dispensing unit may include a first valve and a second valve downstream from the first valve. For example, dispensing unit 102 has a first valve 104 disposed adjacent inlet 110 and a second valve 106 disposed adjacent outlet 114. Second valve 106 is located downstream from first valve 104. The configuration of having two valves helps protect the fluid within the flow channel from being exposed to air. For example, since second valve 106 is closer to outlet 114 than first valve 104 is, closing second valve 106 can prevent air from coming up through outlet 114 to the space upstream from first valve 104. In this way, the second valve may protect the first valve from air. Closing both valves further ensures that air does not travel to the space upstream from first valve 104.

As discussed in more detail below with respect to FIGS. 2-7, the second valve may be independently removable from the dispensing unit and from the first valve. This means that the portion of the flow channel containing the second valve may be removed and replaced when a clog forms or begins to form near the second valve While second valve 106 is disposed before outlet 114, it is understood that the second valve may be disposed at the outlet of the dispensing unit. The first valve and the second valve may be disposed within the flow channel such that first valve and the second valve may each independently stop the flow of fluid within the flow channel. The second valve may be spaced apart from the first valve such that a portion of the flow channel extends between the first valve and the second valve.

In some embodiments, the first valve may be configured to be throttled. For example, first valve 104 is a servo valve. As discussed with respect to FIGS. 2-7 below, the first valve may have various positions controlling the flow rate of fluid flowing through the first valve.

FIGS. 2-7 show a schematic diagram of an embodiment of a dispensing unit 200 having a first valve 202 and a second valve 204. FIGS. 2-7 show more structural details of how a dispensing unit may be configured and how the fluid may be controlled during different stages of filling. Dispensing unit 200 is shown in isolation from other parts of the system. Dispensing unit 200 includes a portion of a flow channel 210 integrally formed with first valve 202. FIGS. 2-7 show first valve 202 and second valve 204 as ball valves that may be rotated to different positions. It is understood that the first valve and the second valve may include other types of valves. For example, the first valve and/or the second valve may include any type of valve suitable for throttling.

The second valve may be removable such that the second valve is replaceable. For example, as shown in FIGS. 2-7, second valve 204 may be provided on a removable tube 212. A portion of the flow channel adjacent first valve 202 includes a first attachment area 206 and tube 212 includes a second attachment area 208. Tube 212 is removably attached to flow channel 210 by a press fit. In other embodiments, the tube may be removably attached to the flow channel by an attachment mechanism, such as threads, screws, a quick-connect, a tongue and groove, and a bead and a groove, etc.

Figure 2:
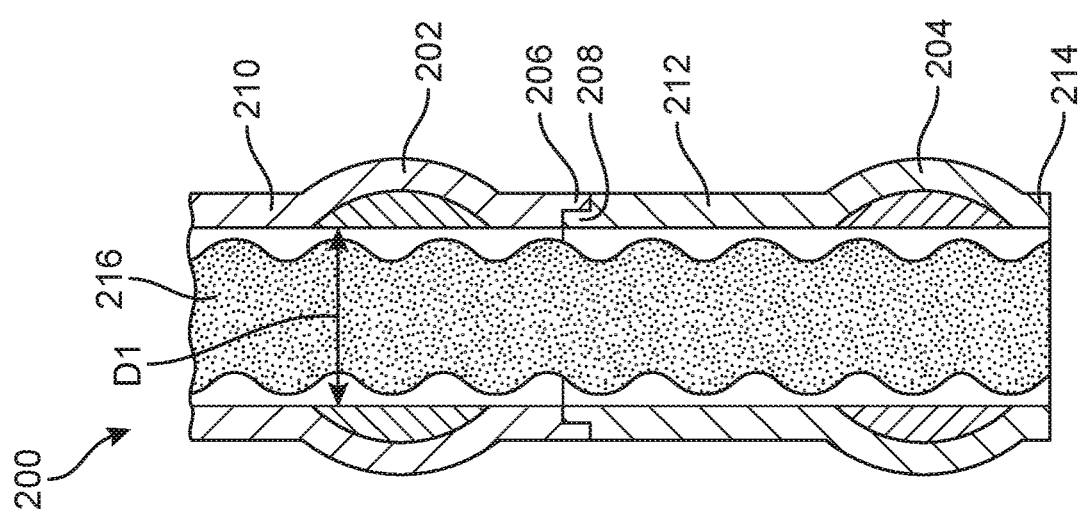
FIG. 2 is a schematic diagram of an embodiment of a dispensing unit of the system with a first valve and a second valve in a fully open position.

FIGS. 2-7 demonstrate the various positions the valves may be in. In FIG. 2, first valve 202 and second valve 204 are fully open. As shown in FIG. 2, D1 is the passageway provided by first valve 202 in the fully open position. D1 is the maximum passageway provided by first valve 202. It is understood that second valve 204 also provides a maximum passageway in the fully open position. As shown in FIG. 2, a flow of fluid 216 is not restricted by either first valve 202 and second valve 204.

Figure 3:
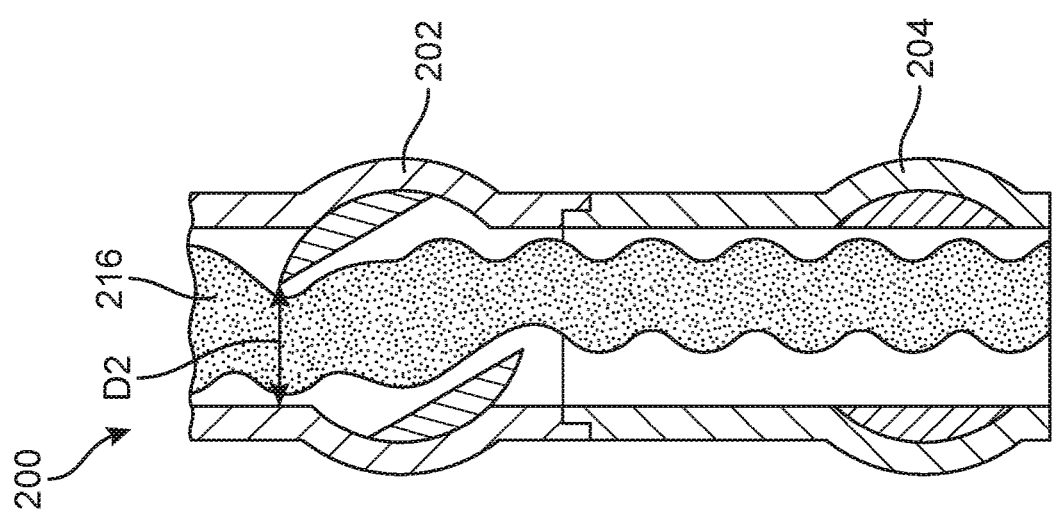
FIG. 3 is a schematic diagram of an embodiment of a dispensing unit of the system with the first valve in a first partially open position and the second valve in a fully open position.

In FIG. 3, first valve 202 is rotated to a first partially open position and second valve 204 is shown in a fully open position. As shown in FIG. 3, D2 is the passageway provided by first valve 202 in the first partially open position. D2 is less than the maximum passageway provided by first valve 202. As shown in FIG. 3, first valve 202 restricts the flow of fluid 216. Accordingly, placing first valve 202 in the first partially open position slows the flow rate of the fluid being dispensed by the fluid dispensing unit.

Figure 4:
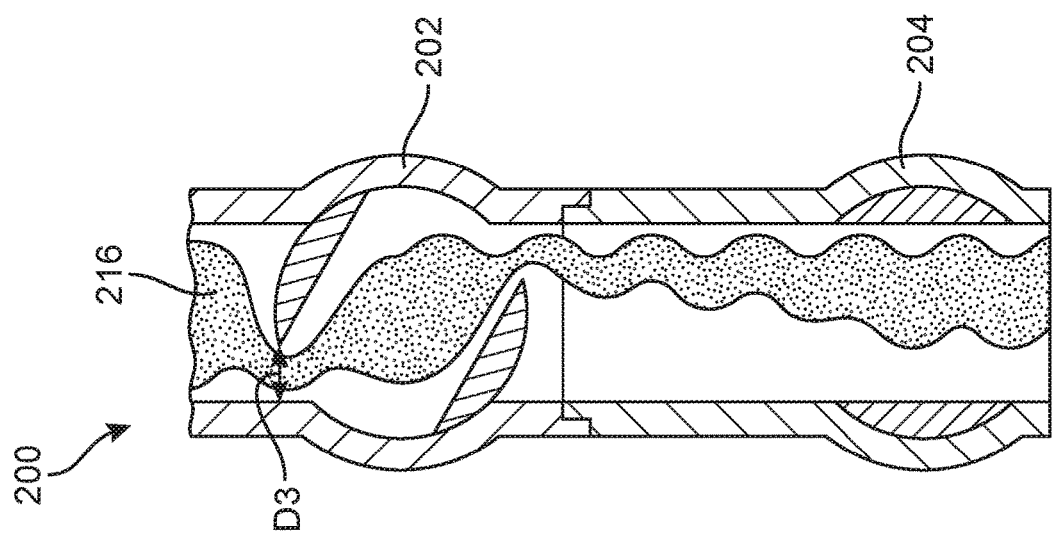
FIG. 4 is a schematic diagram of an embodiment of a dispensing unit of the system with the first valve in a second partially open position and the second valve in a fully open position.

In FIG. 4, first valve 202 is rotated to a second partially open position and second valve 204 is shown in a fully open position. As shown in FIG. 4, D3 is the passageway provided by first valve 202 in the second partially position. D3 is less than both D2 and the maximum passageway provided by first valve 202. As shown in FIG. 4, first valve 202 restricts the flow of fluid 216. Accordingly, placing first valve 202 in the second partially open position slows the flow rate of the fluid being dispensed by the fluid dispensing unit. The flow rate of the fluid is decreased when first valve 202 is moved from either the fully open position or the first partially open position to the second partially open position.

Figure 5:
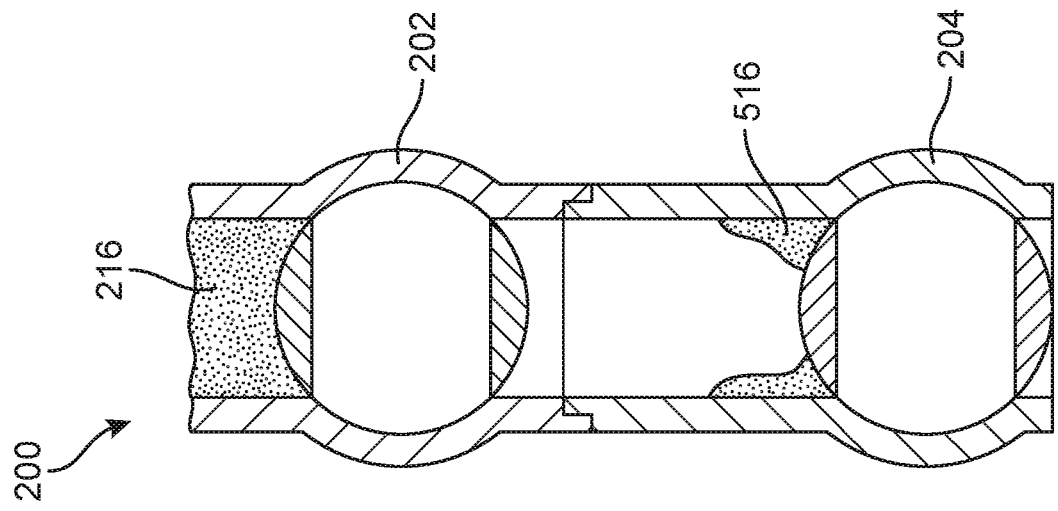
FIG. 5 is a schematic diagram of an embodiment of a dispensing unit of the system with the first valve in a fully closed position and the second valve in a fully open position.

In FIG. 5, first valve 202 is rotated to a fully closed position and second valve 204 is shown in a fully open position. As shown in FIG. 5, no passageway is provided by first valve 202 in the fully closed position. As shown in FIG. 5, first valve 202 stops the flow of fluid 216 from a point before first valve 202. FIG. 5 demonstrates how over time fluid 216 may solidify against the walls of tube 212. Reference number 516 indicates the solidified fluid and reference number 520 indicates a particle of solidified fluid being dispensed from the dispensing unit. It is understood that fluid may solidify or begin to solidify along any surface inside of the dispensing unit, including within the valves or the walls of the flow channel. As shown in FIG. 5, particles of solidified fluid may drop away from the dispensing unit even after the first valve is closed.

Figure 6:
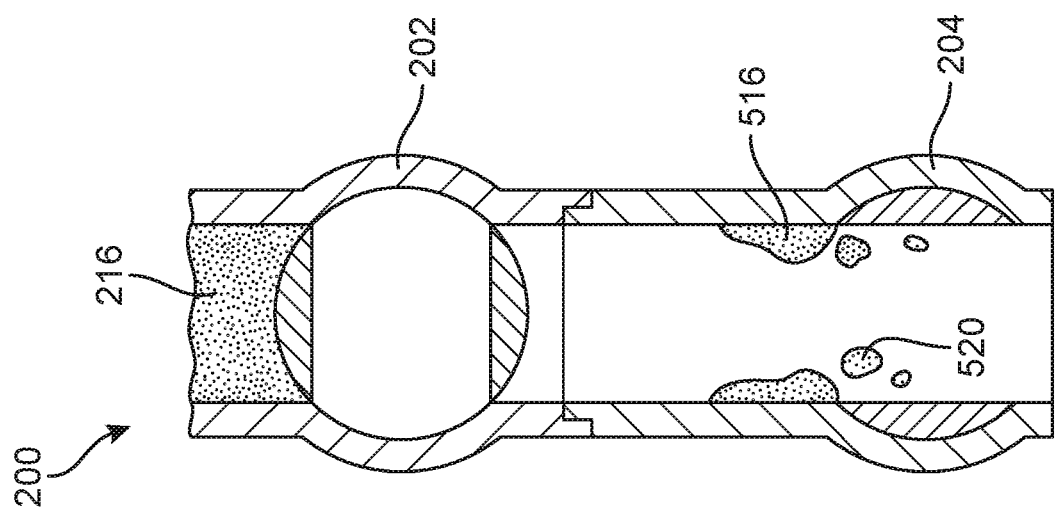
FIG. 6 is a schematic diagram of an embodiment of a dispensing unit of the system with the first valve and the second valve in a fully closed position.

In FIG. 6, first valve 202 and second valve 204 are rotated to a fully closed position. As shown in FIG. 5, no passageway is provided by first valve 202 or second valve 204 in the fully closed position.

Figure 7:
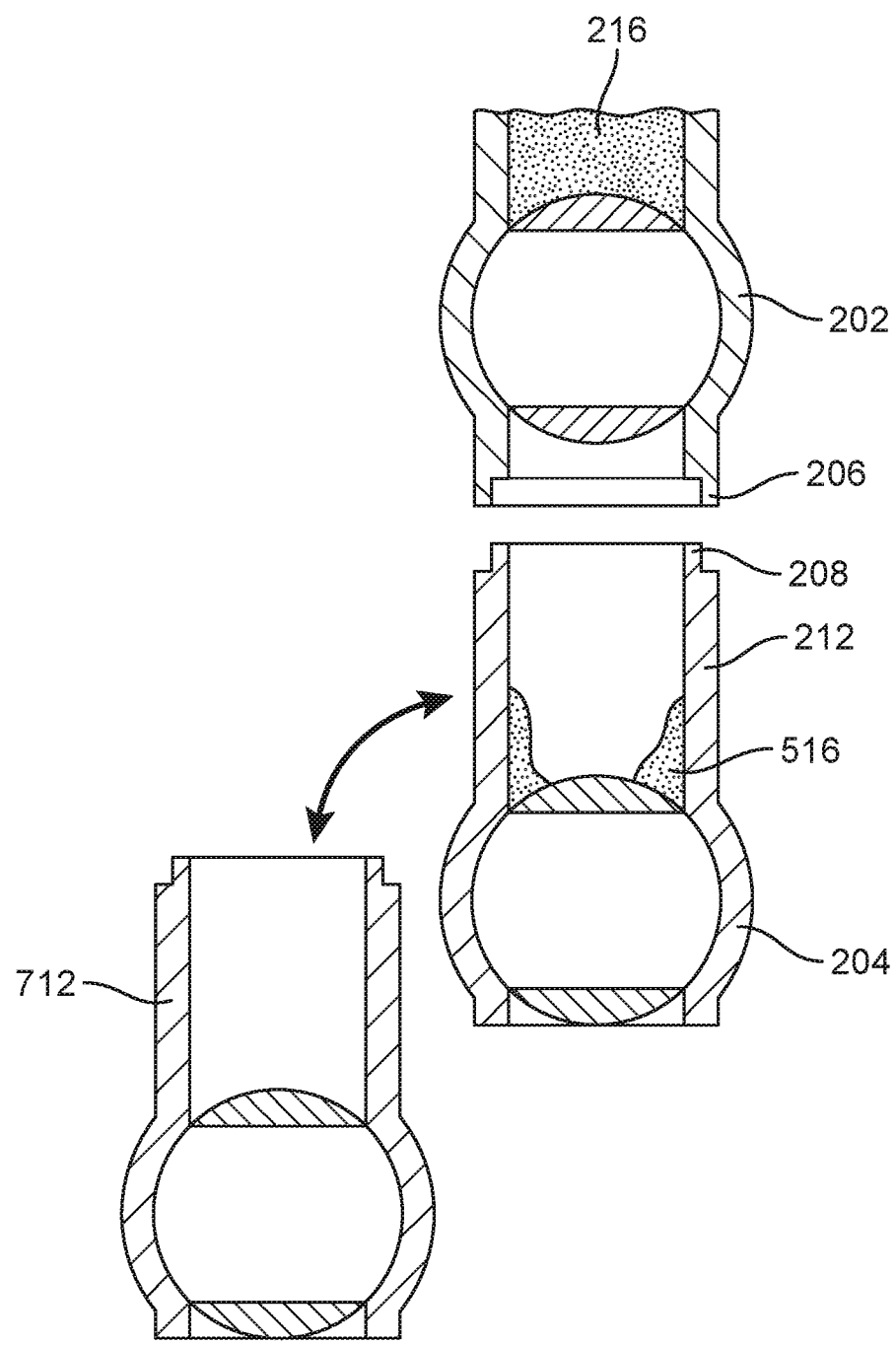
FIG. 7 is a schematic diagram of an embodiment of a dispensing unit of the system with the dirty second valve being replaced by a clean valve.

FIG. 7 demonstrates how clogged tube 212 may be replaced with clean tube 712. By replacing a clogged tube, the dispensing unit may still be run while the clogged tube is being clean. This replacement can reduce down times for the dispensing unit and may increase productivity.

Figure 8A:
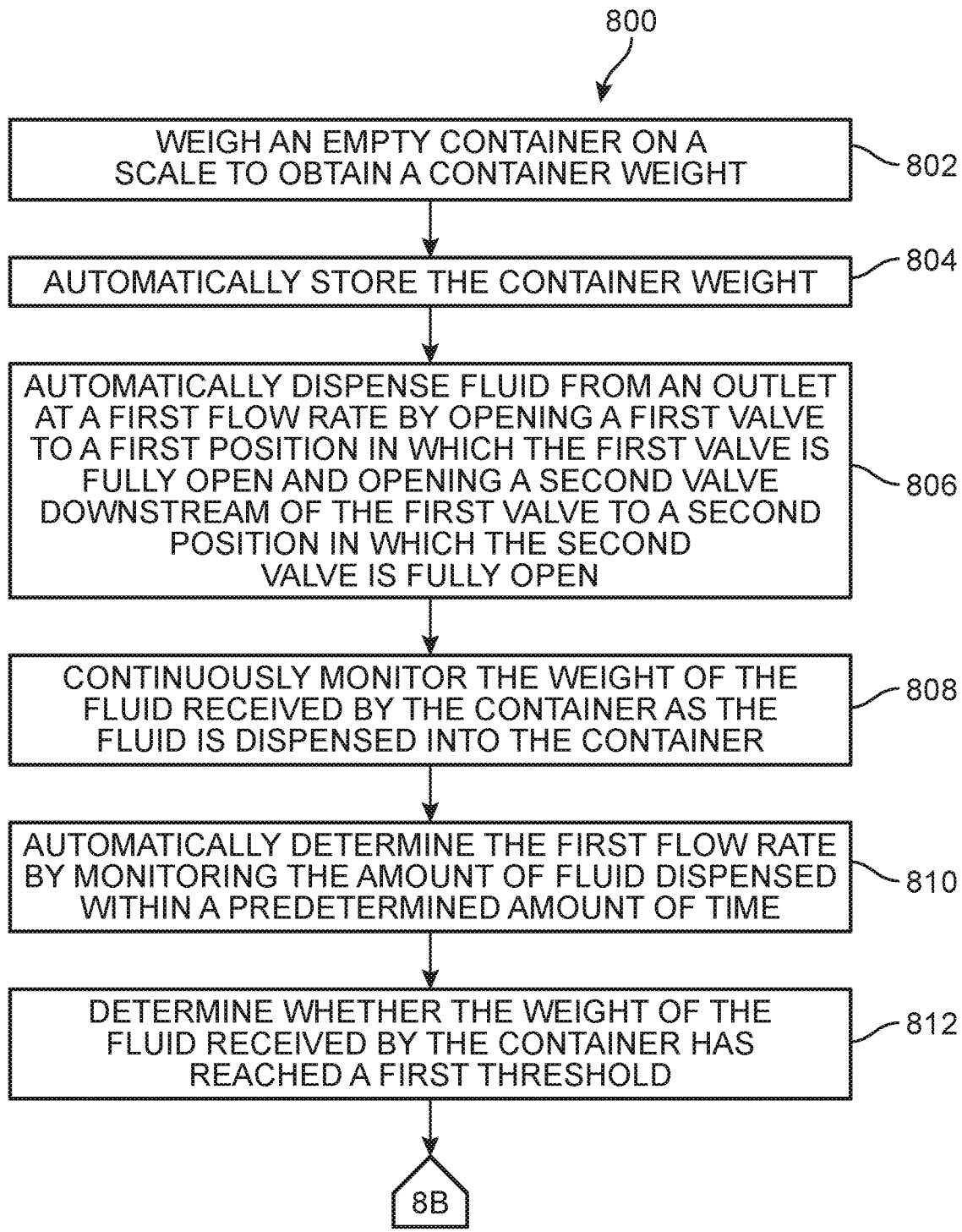
FIGS. 8A and 8B show an embodiment of a method for filling containers with a precise amount of fluid.
Figure 8B:
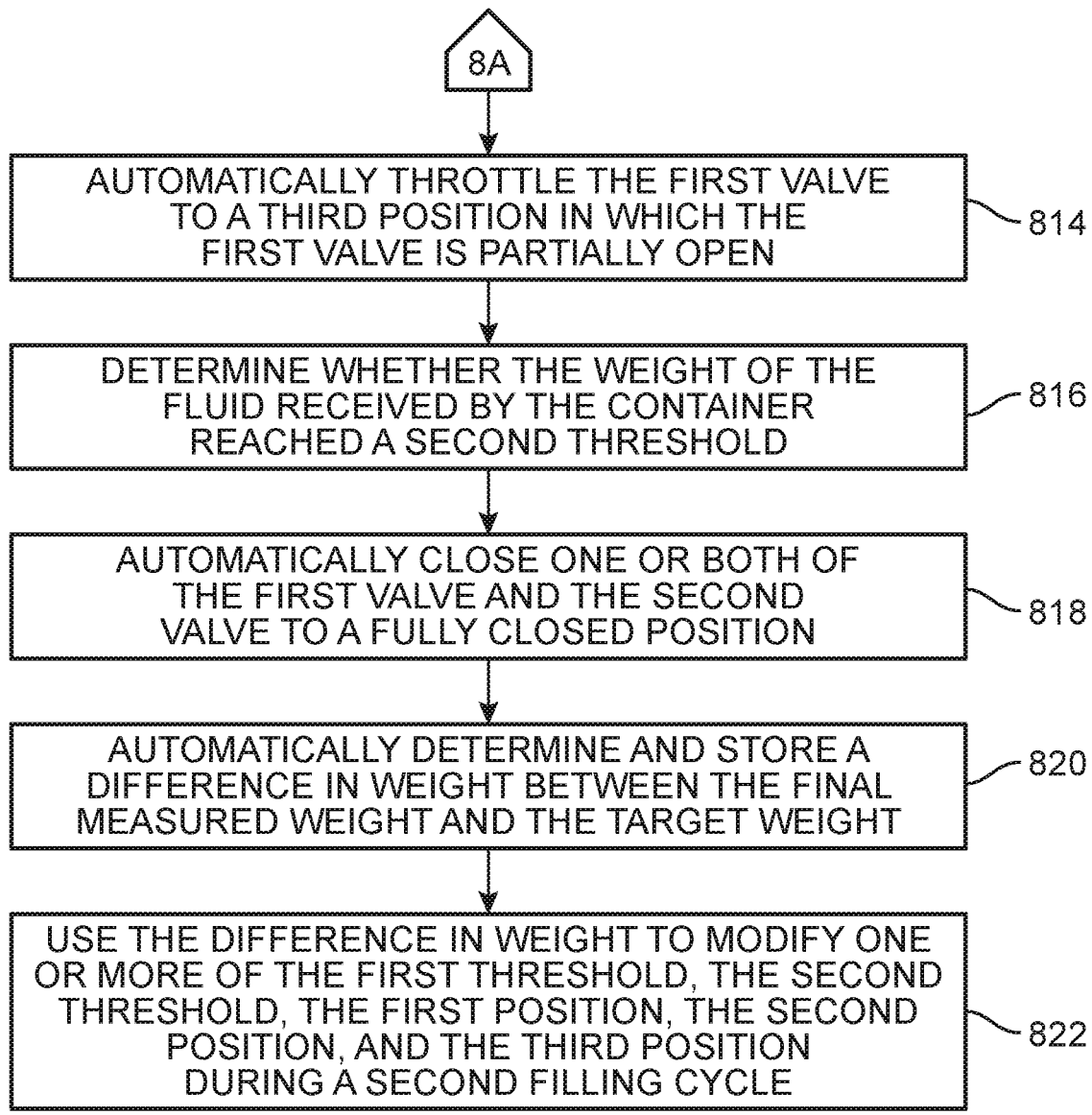

The method of filling containers with a precise amount of fluid may include weighing an empty container on a scale to obtain a container weight. For example, FIGS. 8A and 8B show an embodiment of a method of filling containers with a precise amount of fluid 800 (or method 800) including weighing an empty container on a scale to obtain a container weight (operation 802). In some embodiments, the method may further include automatically storing the container weight. For example, method 800 includes automatically storing the container weight (operation 804). In some embodiments, instead of or in addition to separately storing the container weight, the method may include subtracting the container weight from any future measurements taken during a filling cycle. Measuring the weight of the empty container may allow for the customization of each filling cycle based on the weight of the empty container. This way, if there is any variation in the weight of containers, the operation of the valves will automatically be adjusted for the weight of the container used during a particular filling cycle.

The method of filling containers with a precise amount of fluid may include automatically dispensing fluid from an outlet at a first flow rate by opening a first valve to a first position in which the first valve is fully open and opening a second valve downstream of the first valve to a second position in which the second valve is fully open. For example, method 800 includes automatically dispensing fluid from an outlet at a first flow rate by opening a first valve to a first position in which the first valve is fully open and opening a second valve downstream of the first valve to a second position in which the second valve is fully open (operation 806). FIG. 2 shows exemplary positions for the valves during operation 806.

The method of filling containers with a precise amount of fluid may include continuously monitoring the weight of the fluid received by the container as the fluid is dispensed into the container. For example, method 800 includes continuously monitoring the weight of the fluid received by the container as the fluid is dispensed into the container (operation 808). In some embodiments, continuously monitoring the weight of the fluid received by the container as the fluid is dispensed into the container may include taking readings in real-time at 300 times per second. In some embodiments, continuously monitoring the weight of the fluid received by the container as the fluid is dispensed into the container may include continuously monitoring the combination of the weight of the container and the fluid received by the container as the fluid is dispensed into the container. In other embodiments, continuously monitoring the weight of the fluid received by the container as the fluid is dispensed into the container may include subtracting the weight of empty container from the weight captured by the scale.

In some embodiments, the method of filling containers with a precise amount of fluid may include automatically determining the first flow rate by monitoring the amount of fluid dispensed within a predetermined amount of time. For example, method 800 includes automatically determining the first flow rate by monitoring the amount of fluid dispensed within a predetermined amount of time (operation 810).

The method of filling containers with a precise amount of fluid may include automatically determining when a first threshold is reached. For example, the method may include determining when a first predetermined period of time has elapsed. In such embodiments, a first predetermined amount of time may be set or selected based on a variety of factors, such as the target final weight of the fluid filling the container, the type of fluid, and/or the viscosity of the fluid. In another example, the method may include automatically determining when the weight of the fluid received by the container reaches a first threshold. In such embodiments, the first threshold may be set or selected based on a variety of factors, such as the target final weight of the fluid filling the container, the type of fluid, and/or the viscosity of the fluid. Method 800 includes automatically determining when the weight of the fluid received by the container reaches a first threshold (operation 812). In some embodiments, the first threshold may be a predetermined percentage of the weight set as the target weight for the fluid held in a filled container. For example, in some embodiments, the first threshold may be approximately 98% of the target weight. In another example, in other embodiments, the first threshold may be approximately 95% of the target weight. Through the artificial neural network, the first threshold may be set, selected, or modified additionally based on past measurements taken during past completed filling cycles. In this way, the method may be refined over time. Additionally or alternatively, the first threshold may be modified based on real-time measurements taken during a present filling cycle.

The method of filling containers with a precise amount of fluid may include automatically dispensing fluid from the outlet at a second flow rate by throttling the first valve to a third position in which the first valve is partially open when the first threshold is reached. For example, method 800 includes automatically dispensing fluid from the outlet at a second flow rate by throttling the first valve to a third position in which the first valve is partially open when the weight of the fluid received by the container reaches the first threshold (operation 814). In another example, the method may include automatically dispensing fluid from the outlet at a second flow rate by throttling the first valve to a third position in which the first valve is partially open when a first predetermined amount of time has elapsed. FIGS. 3 and 4 show exemplary positions for the first valve during operation 814.

The method of filling containers with a precise amount of fluid may include automatically determining when a second threshold is reached. For example, the method may include determining when a second predetermined period of time has elapsed. In such embodiments, a second predetermined amount of time may be set or selected based on a variety of factors, such as the target final weight of the fluid filling the container, the type of fluid, and/or the viscosity of the fluid. In another example, the method of filling containers with a precise amount of fluid may include automatically determining when the weight of the fluid received by the container reaches a second threshold. In such embodiments, the second threshold may be set or selected based on a variety of factors, such as the target final weight of the fluid filling the container, the type of fluid, and/or the viscosity of the fluid. Method 800 includes automatically determining when the weight of the fluid received by the container reaches a second threshold (operation 816). In some embodiments, the second threshold may be the weight set as the target weight for the fluid held in a filled container. In other embodiments, the second threshold may be a weight at which the neural network determines that a little more fluid may still drop into the container, even with though one or both of the first and second valves are closed. In such embodiments, the additional fluid dropping into the container may push the weight of the fluid received by the container to the target weight. It is understood that the target weight may include tolerances that are either set by a user or automatically built in. Through the artificial neural network, the second threshold may be set, selected, or modified based on past measurements taken during past completed filling cycles. In this way, the method may be refined over time. Additionally or alternatively, the first threshold may be modified based on real-time measurements taken during a present filling cycle.

The method of filling containers with a precise amount of fluid may include automatically closing one or both of the first valve and the second valve to a fully closed position. For example, method 800 includes automatically closing one or both of the first valve and the second valve to a fully closed position (operation 818). FIGS. 5 and 6 show exemplary positions for the valves during operation 818. In some embodiments, the method of filling containers with a precise amount of fluid may include automatically closing one or both of the first valve and the second valve to a fully closed position when the weight of the fluid received by the container reaches the second threshold. In other embodiments, the method of filling containers with a precise amount of fluid may include automatically closing one or both of the first valve and the second valve to a fully closed position when a predetermined amount of time has passed. For example, in such embodiments, a predetermined amount of time may be set or selected based on a variety of factors, such as the target final weight of the fluid filling the container, the type of fluid, and/or the viscosity of the fluid.

The method of filling containers with a precise amount of fluid may include automatically determining a difference in weight between the final measured weight and the target weight for the fluid filling the container. For example, method 800 includes determining a difference in weight between the final measured weight and the target weight for the fluid filling the container (operation 820). As exemplified by operation 820, in some embodiments, the method may include storing the difference in weight between the final measured weight and the target weight for the fluid filling the container. The difference in weight, as well as any other measurements, may be stored, for example, in a data storage system, such as a cloud-enabled data storage system or in a data storage system in a local hard drive. This automatic storage can eliminate the need for human data logging and reporting, which is time-consuming and prone to errors. Instead, the method may include automatically storing readings with time stamps and automatically generating reports.

As explained below, the difference between the final measured weight and the target weight may be retrieved in future filling cycles. The cycle performance feedback is fed as input to neural network, which calibrates performance of the next cycle for having parameters that improve the precision of filling a container. For example, the parameters for switching from the first flow rate to the second flow rate may be calibrated based on the deviation between the final measured weight and the target weight for the fluid filling the container in previous cycles. In other words, the shutoff parameters (e.g., timing of closing the valves based on a measured time period or a threshold for the measured weight of the fluid filling the container) are calibrated based on the continuous monitoring during filling and feedback from previous cycles so as to have the closure in advance if deviation is positive and retarded if deviation is negative.

In some embodiments, the method may include performing a second filling cycle including using the difference in weight to modify one or more of the target weight, the first threshold, the second threshold, the first position, the second position, and the third position. For example, method 800 includes performing a second filling cycle including using the difference in weight to modify one or more of the first threshold, the second threshold, the first position, the second position, and the third position (operation 822). In another example, a future filling cycle may be modified to change the position of the first valve and/or second valve at different times based on the difference in weight determined in a previous filling cycle.

In some embodiments, the entire method may be automated such that the system may run with a conveyor system moving containers beneath the dispensing unit.

It is understood that through the artificial neural network, any parameters may be set, selected, or modified based on measurements taken during past filling cycles. In this way, the method may be refined over time. Additionally or alternatively, any parameters may be may be modified based on real-time measurements taken during a present filling cycle.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of filling containers with a precise amount of fluid, comprising:
   performing a first filling cycle including:
      weighing an empty container on a scale to obtain a container weight;

automatically dispensing fluid from an outlet at a first flow rate by opening a first valve to a first position in which the first valve is fully open and opening a second valve downstream of the first valve to a second position in which the second valve is fully open;

continuously monitoring a weight of the fluid received by the container as the fluid is dispensed into the container;

automatically determining when a first threshold is reached;

automatically dispensing fluid from the outlet at a second flow rate by throttling the first valve to a third position in which the first valve is partially open based on reaching the first threshold;

automatically determining when a second threshold is reached;

automatically closing the first valve to a fully closed position when the second threshold is reached;

automatically storing the final measured weight of fluid filling the container once the first valve is in a fully closed position;

automatically determining and storing a difference in weight between the final measured weight and a target weight for the fluid filling the container;

performing a second filling cycle including:
using the difference in weight to modify the first threshold.

2. The method of claim 1, wherein automatically storing the final measured weight of fluid filling the container includes storing:
the final measured weight, and
a time stamp.

3. The method of claim 1, further comprising automatically generating reports, the reports including filling data.

4. The method of claim 1, wherein using the difference in weight to modify the first threshold includes using a neural network to calibrate the performance of the second filling cycle.

5. The method of claim 1, wherein continuously monitoring the weight of the fluid received by the container includes taking readings approximately 300 times per second.

6. The method of claim 1, wherein the first threshold is a predetermined weight of the fluid received by the container.

7. The method of claim 1, wherein the first threshold is a predetermined period of time.

8. The method of claim 1, wherein the second threshold is a predetermined weight of the fluid received by the container.

9. The method of claim 1, wherein the second threshold is a predetermined period of time.

10. A system for filling containers with a precise amount of fluid, comprising:
a dispensing unit configured to be mechanically connected to a vessel containing a fluid, wherein the dispensing unit includes an inlet, a first valve disposed adjacent the inlet, a second valve downstream of the first valve, and an outlet downstream of the second valve;
a scale configured to receive a container in a position beneath the outlet;
a device processor in electrical communication with both the scale and the dispensing unit; and
a non-transitory computer readable medium storing instructions that are executable by the device processor to:

perform a first filling cycle including:
receiving the weight of an empty container;
automatically controlling dispensing of fluid from an outlet at a first flow rate by causing the first valve to open to a first position in which the first valve is fully open and by causing the second valve to open to a second position in which the second valve is fully open;
continuously monitoring the weight of the fluid received by the container as the fluid is dispensed into the container;
determining when a first threshold has been reached;
automatically controlling dispensing fluid from the outlet at a second flow rate when the first threshold has been reached;
determining when a second threshold has been reached;
causing both the first valve and the second valve to close to a fully closed position when the second threshold has been reached; and
storing the final measured weight of fluid filling the container, along with a time stamp, once the first valve is in a fully closed position; and perform a second filling cycle including:
using the difference in weight between the final measured weight and the target weight for the fluid filling the container to modify the first threshold.

11. The system of claim 10, wherein continuously monitoring the weight of the fluid received by the container includes taking readings approximately 300 times per second and the first threshold is one of a predetermined weight of the fluid received by the container and a predetermined period of time.

12. The system of claim 10, further comprising automatically generating reports, the reports including filling data.

13. The system of claim 10, wherein the dispensing unit further includes a portion of a flow channel integrally formed with the first valve and a tube disposed downstream of the first valve, and
wherein the portion of the flow channel adjacent the first valve includes a first attachment area, and
wherein the tube is integral with the second valve and includes a second attachment area that removably connects the first attachment area to the second attachment area such that the tube is disposed between the first valve and the second valve during connection.

14. The system of claim 10, wherein the second threshold is one of a predetermined weight of the fluid received by the container and a predetermined period of time.

15. The system of claim 10, wherein the first threshold is one of a predetermined weight of the fluid received by the container and a predetermined period of time.

16. A system for filling containers with a precise amount of fluid, comprising:
a dispensing unit configured to be mechanically connected to a vessel containing a fluid, wherein the dispensing unit includes an inlet, a first valve disposed adjacent the inlet, a second valve downstream of the first valve, and an outlet downstream of the second valve;
a scale configured to receive a container in a position beneath the outlet;
a device processor in electrical communication with both the scale and the dispensing unit; and a non-transitory computer readable medium storing instructions that are executable by the device processor to:
perform a first filling cycle including:
receiving the weight of an empty container;
automatically controlling dispensing of fluid from an outlet at a first flow rate by causing the first valve to open to a first position in which the first valve is fully open and by causing the second valve to open to a second position in which the second valve is fully open;
continuously monitoring the weight of the fluid received by the container as the fluid is dispensed into the container;
determining when a first threshold has been reached;
automatically controlling dispensing fluid from the outlet at a second flow rate by causing the first valve to throttle to a third position in which the first valve is partially open when the first threshold has been reached;
determining when a second threshold has been reached;
causing the first valve to close to a fully closed position when the second threshold has been reached;
storing the final measured weight of fluid filling the container once the first valve is in a fully closed position;
determining and storing a difference in weight between the final measured weight and a target weight for the fluid filling the container;
perform a second filling cycle including:
using the difference in weight to modify the first threshold.

17. The system of claim 16, wherein automatically storing the final measured weight of fluid filling the container includes storing:
the final measured weight, and
a time stamp.

18. The system of claim 16, wherein continuously monitoring the weight of the fluid received by the container includes taking readings approximately 300 times per second.

19. The system of claim 16, wherein the first threshold and the second threshold are each one of a predetermined weight of the fluid received by the container and a predetermined period of time.

20. The system of claim 16, further comprising automatically generating reports, the reports including filling data.

* * * * *